United States Patent [19]

Fiduccia

[11] Patent Number: 4,739,476
[45] Date of Patent: Apr. 19, 1988

[54] LOCAL INTERCONNECTION SCHEME FOR PARALLEL PROCESSING ARCHITECTURES

[75] Inventor: Charles M. Fiduccia, Schenectady, N.Y.

[73] Assignee: General Electric Company, Schenectady, N.Y.

[21] Appl. No.: 761,269

[22] Filed: Aug. 1, 1985

[51] Int. Cl.[4] ............................................. G06F 13/00
[52] U.S. Cl. ............................ 364/200; 364/200/232
[58] Field of Search ... 364/200 MS File, 900 MS File, 364/716, 736, 748; 382/27, 41, 49; 340/825.02, 825.03

[56] References Cited

U.S. PATENT DOCUMENTS

| | | | |
|---|---|---|---|
| 3,106,698 | 10/1963 | Unger | 382/41 |
| 3,287,703 | 11/1966 | Slotnick | 364/200 |
| 3,312,943 | 4/1967 | McKindles et al. | 364/200 |
| 3,364,472 | 1/1968 | Sloper | 364/200 |
| 3,537,074 | 10/1970 | Stokes et al. | 364/200 |
| 3,815,095 | 6/1974 | Wester | 364/200 |
| 4,247,892 | 1/1981 | Lawrence | 364/200 |
| 4,270,170 | 5/1981 | Reddaway | 364/200 |
| 4,499,607 | 2/1985 | Higgins | 455/606 |
| 4,547,898 | 10/1985 | Tsikos | 382/4 |
| 4,593,351 | 6/1986 | Hong et al. | 364/200 |
| 4,621,339 | 11/1986 | Wagner et al. | 364/900 |
| 4,644,496 | 2/1987 | Andrews | 364/900 |

OTHER PUBLICATIONS

F. P. Preparata et al., "The Cube–Connected Cycles: A Versatile Network for Parallel Computation", Comm. of the ACM, May 1981, vol. 24, No. 5, pp. 300–309.
R. Asbury et al., "Concurrent Computers Ideal for Inherently Parallel Problems", Computer Design, Sep. 1985, pp. 99–107.

*Primary Examiner*—Archie E. Williams, Jr.
*Assistant Examiner*—Florin Munteanu
*Attorney, Agent, or Firm*—Richard V. Burgujian; James C. Davis, Jr.; Paul R. Webb, II

[57] ABSTRACT

Method and apparatus for interconnecting the processing cells of a parallel processing machine configured in a two-dimensional rectangular array in which each cell includes a plurality of ports, each port having a unique port address, and a plurality of cells have similarly addressed ports. The cells are interconnected, via the cell ports, to form cell clusters having a central cell and eight neighboring cells such that a plurality of neighboring cells share a common connection to the central cell and further such that no two similarly addressed ports are coupled to one another. During a data transfer operation, in accordance with the single instruction multiple data (SIMD) format, each cell transmits data from one port and receives data from another port such that all cells transmit data from similarly addressed ports and receive data at similarly addressed ports to provide data transfer throughout the array in a uniform direction.

23 Claims, 3 Drawing Sheets

LOCAL INTERCONNECTION SCHEME FOR PARALLEL PROCESSING ARCHITECTURES

BACKGROUND OF THE INVENTION

The present invention is directed in general toward distributed processing systems and, more particularly, toward a local interconnection scheme for use with very high speed distributed processing networks.

Distributed processing is used herein to refer to systems in which a plurality of independent signal processing cells interact to perform a multiplicity of signal processing functions. Local interconnection, or neighborhood interconnection schemes are those in which each processor is adapted to communicate with only a few neighboring processors. Distributed processing architectures utilizing a neighborhood interconnection scheme are preferred for applications in which signal processing functions must be performed on a multiplicity of signal, and wherein each function need be performed with only a portion of the data signals.

The aforementioned systems find ready application to processing of data representing some real time characteristic of dimensional space, e.g., radar and image reconstruction applications. In such applications, one processor may be associated with a distinct point in space and will receive a series of input data representing some particular spatial characteristic of the point with which it is associated. Intermediate data input, each processor will interact with neighboring processors to perform processing functions on its received data vis-a-vis its neighbors received data, e.g., filtering, averaging, etc., so as to provide uniform transitions from one point to the next. Consequently, when distributed processing networks are employed to represent dimensional space, one processor of the network need only interact with its neighboring processors, via some local neighborhood interconnection scheme, to perform the necessary processing functions.

In addition to representing dimensional space, other applications for distributed processing systems exist where neighborhood connection schemes are desirable. For example, distributed processing systems are particularly suitable for use with graph algorithms and matrix computations.

When local interconnection schemes are selected for distributed processing systems, it is desirable to provide communication flexibility by maximizing the number of neighboring processors with which each processor can communicate, while also minimizing the number of connections between processors as well as minimizing the time necessary for intercommunication.

One prior art method for interconnecting processors of a two dimensional rectangular processor array provides a dedicated connection between each processor and each of its eight neighbors. While this method is fast and flexible, it uses eight connections for each processor thereby increasing production costs. This interconnection scheme is especially undesirable when the system is embodied in an integrated semiconductor circuit as this method increases the number of semiconductor input/output pads necessary for intercircuit communication. Further, the number of semiconductor input/output pads which can be provided for each semiconductor circuit is limited by physical constraints and, therefore, limits the number of components which can be embodied in a single semiconductor circuit. Thus, in addition to increasing costs as discussed above, the dedicated local connection method limits the number of processors which can be embodied in a single semiconductor circuit by increasing the number of input/output pads necessary for intercircuit communication.

Another prior art neighborhood connection scheme for interconnecting the processors of a two dimensional rectangular array uses multiplexing hardware to reduce the number of connections at the expense of circuit cost and circuit speed. Still another prior art method for interconnecting processors in a distributed processing neighborhood provides direct connection between each processor and only four of its neighbors requiring all intercommunication with the remaining four to be performed in a two step process via its directly connected neighbor. This method is slower than those discussed above and increases software complexity.

Therefore, there exists a need for a neighborhood interconnection scheme for use with a distributed processing network which: (1) minimizes the number of necessary connections between each processor and its neighboring processors, (2) minimizes the time necessary for communication between a processor and each of its neighbors and (3) maximizes the number of neighboring processors with which each processor can communicate.

SUMMARY OF THE INVENTION

The subject invention addresses these inadequacies of the prior art by providing a neighborhood interconnection scheme for distributed processing networks which maximizes the neighborhood while minimizing the number of necessary connections and the amount of time required for communication with each neighbor.

An array of signal processing cells includes a plurality of identical cell clusters wherein each cluster comprises a central cell and a plurality of neighboring cells. The central cell includes a plurality of ports for transmitting and receiving data, each port having a distinct address. Each neighboring cell is similar to the central cell and includes similarly addressed ports. The neighboring cells are coupled to the central cell via a plurality of coupling nodes in a manner such that a plurality of the neighboring cells are coupled to a common node and, therefore, share a common connection with the central cell. Further, the neighboring cells are coupled to the central cell in a manner such that no two ports having similar addresses are coupled to one another. Correspondingly, no two similarly addressed ports are coupled to a common node.

A controller is provided for controlling the flow of data through the network by controlling the transfer of data between cells using the single instruction multiple data format (SIMD). During a data transfer operation, the transmitting cells each transmit from similarly addressed ports while the receiving cells each receive at similarly addressed ports. In this manner, data is transferred uniformly throughout the array.

It is, therefore, an object of the present invention to provide a neighborhood interconnection scheme for use with a distributed processing network which minimizes the number of necessary connections between processors while maximizing communication flexibility.

It is another object of the present invention to provide a neighborhood interconnection scheme which minimizes the time necessary for a processor to communicate with each of its neighbors.

It is still another object of the present invention to provide a method by which neighboring processors in a distributed processing network can communicate with one another.

BRIEF DESCRIPTION OF THE DRAWINGS

The subject matter which is regarded as invention is particularly pointed out in the claims appended hereto. The invention, however, both as to organization and method of practice, may best be understood from a reading of the following detailed description taken in conjunction with the drawings in which:

DETAILED DESCRIPTION OF THE DRAWINGS

As mentioned hereinabove, the present invention is directed toward distributed processing systems and comprises a local interconnection scheme therefor which maximizes the number of processor cells with which each cell can communicate while minimizing the number of necessary connections and also minimizing the time required for intercell communication.

Figure 1:
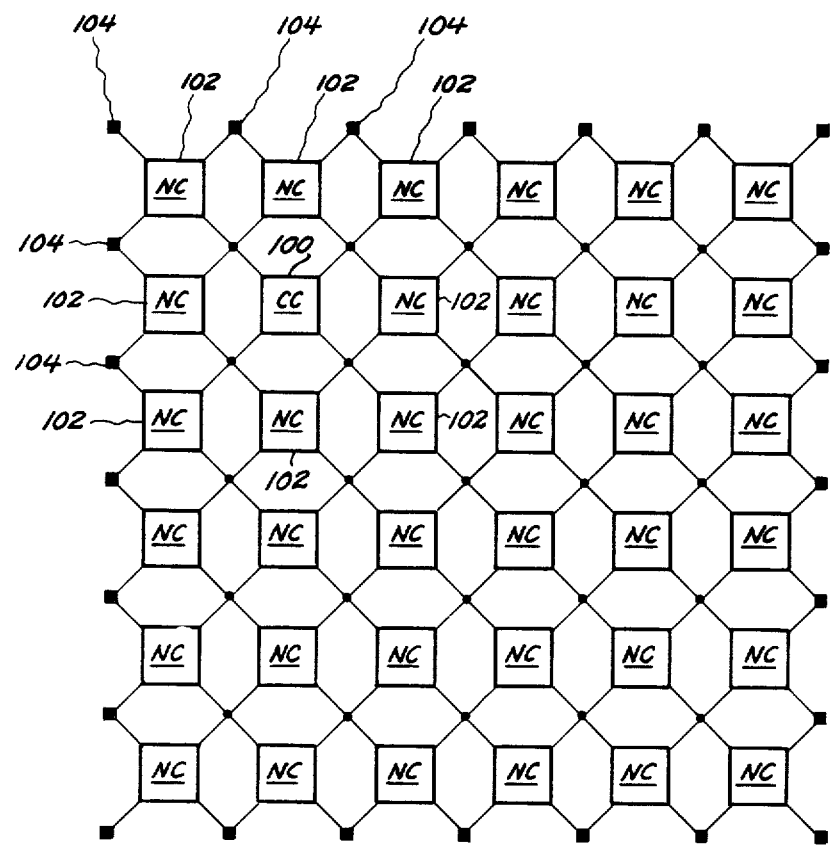
FIG. 1 is an illustrative block diagram of a distributed processing network including the interconnection scheme which is the subject of the present invention.

A distributed processing network interconnected in accordance with the method of the subject invention is shown in FIG. 1. Therein, a plurality of processing cells are arranged in a two dimensional rectangular array and interconnected via a plurality of coupling nodes to provide a distributed processing network. The array is shown to comprise a plurality of clusters wherein each cluster includes a central cell (CC)100 and a plurality of neighboring cells (NC)102. It should be noted that one cell is labelled as a central cell and others as neighboring cells in FIG. 1 only for purposes of discussion and that any cell of FIG. 1 could comprise a central cell with its eight nearest neighbors being neighboring cells thereto.

Figure 2:
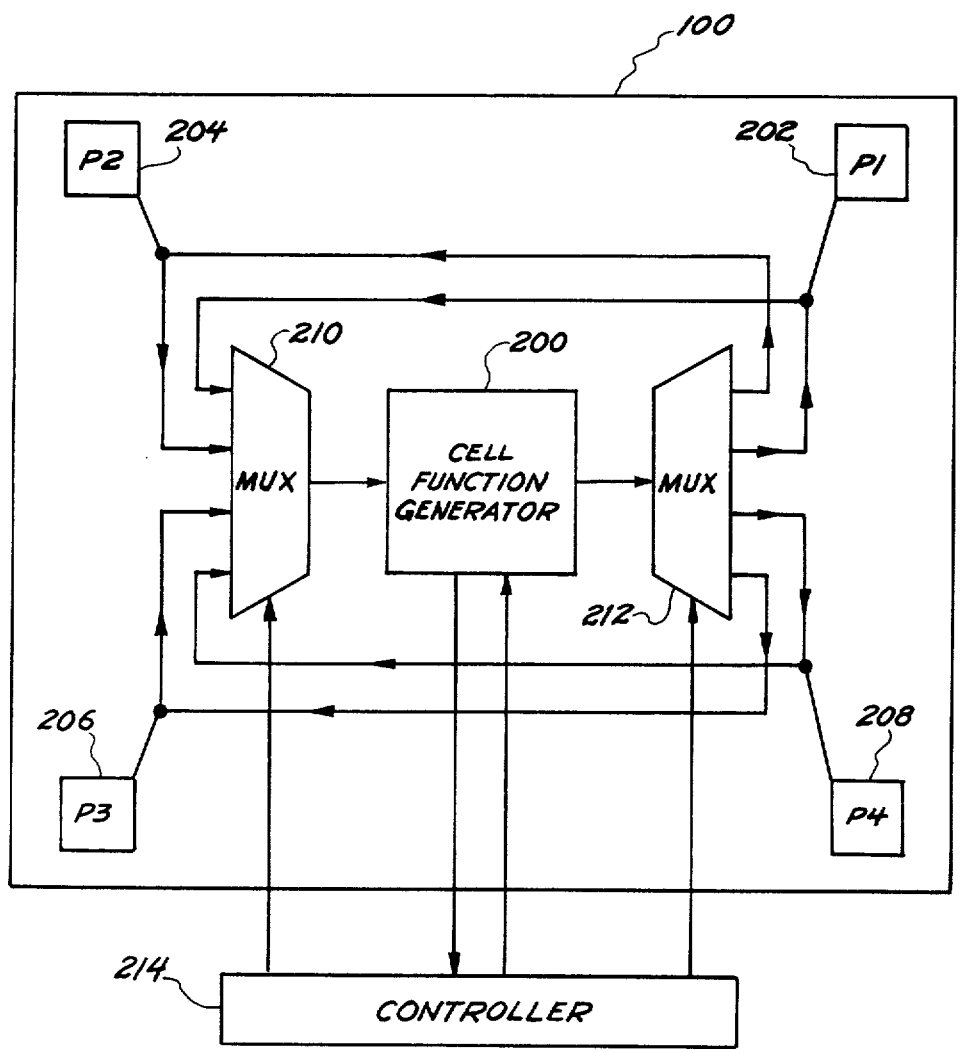
FIG. 2 is a more detailed illustrative block diagram of an exemplary one of the data processing cells shown in FIG. 1.

With reference to FIG. 2, there is shown a more detailed illustrative block diagram of each of the cells of FIG. 1. Although the illustrative block diagram of FIG. 2 is that of central cell 100 of FIG. 1, it is to be understood that all cells of FIG. 1 are similar to central cell 100 as will be described more fully hereinbelow.

Central cell 100 (FIG. 2) comprises a cell function generator 200 for performing the particular signal processing function of cell 100. Cell function generator 200 may comprise any element, or combination of elements, adapted for performing one or more signal processing functions. As an example, cell function generator 200 may comprise memory elements adapted for performing a recording function on one or several input signals. In another embodiment, cell function generator 200 may comprise an arithmetic logic unit for performing arithmetic operations on one or several input signals. In further embodiments, cell function generator 200 may comprise a plurality of elements adapted for performing: filtering functions, averaging functions, integration functions, amplifying functions, etc. Other examples for cell function generator 200 will readily become apparent to those skilled in the art. Further, while each cell of FIG. 1 is adapted to perform some signal processing function, it will be apparent to those skilled in the art that it is not a requirement of the present invention that each cell of FIG. 1 include cell function generators adapted to perform the same signal processing function. Also, while the present invention is being described by reference to data processing cell function generators, it is not limited to data processing but instead is equally applicable to any distributed processing array.

Cell function generator 200 is adapted for receiving information from, and transmitting information to, one of a plurality of ports 202–208 (each having a unique port address P1–P4) via multiplexers 210 and 212, respectively. Multiplexer 210 is coupled to a remote controller 214 for receiving a control input therefrom, which control input selects the particular port from which cell function generator 200 is to receive its input. In similar manner, multiplexer 212 is coupled to controller 214 to receive a control input therefrom, which control input selects to which particular port cell function generator 200 is to transmit its output. Cell function generator 200 is also coupled to controller 214 for receiving control signals therefrom, as well as transmitting control signals thereto. During one data transfer operation, each cell function generator can be controlled by controller 214 to either transmit data, receive data, both transmit and receive, or neither transmit nor receive data. In an alternate embodiment, each cell may be configured to both transmit and receive during each data transfer operation.

Ports 202–208 may comprise electrical conduction, or any other, means for coupling multiplexers 210 and 212 of central cell 100 to neighboring cells 102. Addresses P1–P4 comprise means or method for distinguishing between ports 202–208. In the present embodiment, addresses P1–P4 comprise four different control signals provided to multiplexers 210 and 212 from controller 214 wherein each signal identifies one of ports 202–208.

Multiplexers 210 and 212 are provided for routing data between ports 202–208 such that cell function generator 200 may receive information from either and transmit information to either in response to control signals received from controller 214. Multiplexers 210 and 212 may comprise any device, or combination of devices, capable of performing this function. Though multiplexers 210 and 212 are shown as devices discrete from cell function generator 200, it is to be understood that multiplexers 210 and 212 may be integrated with cell function generator 200 so as not to be separately identifiable devices. Further, although two multiplexers are used in the preferred embodiment, it will become apparent to those skilled in the art that only one multiplexer 212 need be employed to multiplex the output from cell function generator 200 with ports 202–208, as will be discussed more fully hereinbelow.

Controller 214 may comprise any means for controlling the operation of the cells of FIG. 1, particularly any means for providing control inputs to multiplexers 210 and 212 and control signals to cell function generator 200 as described above. Thus, controller 214 may comprise a general purpose computer, general purpose processor, general purpose microprocessor or any similar device adapted for controlling the operation of central cell 100.

As mentioned hereinabove, each cell of FIG. 1, including neighboring cells 102, is similar to central cell 100 and, further, includes similarly addressed ports. Each neighboring cell 102 is also coupled to controller 214 in the same manner as central cell 100 to exchange control signals therewith which are identical to those provided to central cell 100. In this manner, a single instruction from controller 214, provided to each cell of FIG. 1, is operative to cause data to flow uniformly throughout the entire network, thereby implementing the single instruction multiple data (SIMD) format. Hence, where central cell 100 is controlled to receive its input from port 206 having the address P3, and to transmit its output to port 202 having the address P1, then each neighboring cell 102 will be similarly instructed to receive its input from a similarly addressed port P3 and to provide its output to a similarly addressed port P1.

It will be apparent to those skilled in the art that the illustration of FIG. 2 is but one possible configuration for each cell of FIG. 1. Hence, each cell of FIG. 1 may comprise any device or combination of devices capable of performing the functions described herein with reference to FIG. 2.

Figure 3:
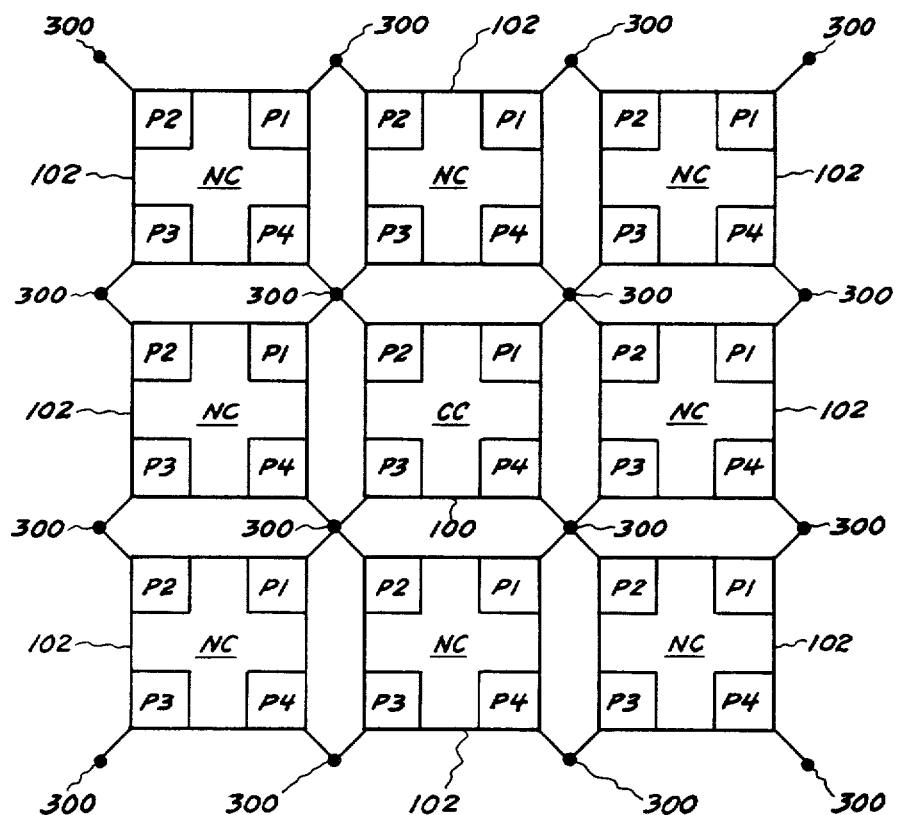
FIG. 3 is an illustrative block diagram of a cell cluster which comprises the network of FIG. 1.

In accordance with the present invention, the array shown in FIG. 1 comprises a multiplicity of cells each similar to central cell 100 arranged in a two dimensional rectangular array. The multiplicity of cells are interconnected so that each cell comprises a cluster in which it is the central cell 100 with a plurality of neighboring cells 102, as illustrated in FIG. 3. Therein, a cell cluster is shown to comprise a central cell 100 including four uniquely addressed ports P1-P4 coupled to a plurality of neighboring cells 102 each including similarly addressed ports. That is, the same port addresses are assigned to each neighboring cell as to the central cell.

A plurality of coupling nodes 300 are provided for interconnecting central cell 100 with each neighboring cell 102. "Node" is used herein to refer to a data connection between different circuit elements. A portion of coupling nodes 300 are coupled to central cell 100 and a plurality of neighboring cells 102 such that a plurality of neighboring cells share a common connection to central cell 100 and such that each node 300 comprises a mini data-bus. Further, each coupling node 300 is coupled to distinctly addressed ports such that no two ports having similar addresses are coupled to one another. Connection in this manner and transmission in accordance with the SIMD format guarantees that only one cell transmits on each node.

Although controller 214 (FIG. 2) is not shown in FIG. 3, it is to be understood that controller 214 is coupled to each neighboring cell 102 in the same manner as it is coupled to central cell 100. Thus, when central cell 100 receives data into the port with address P3 and transmits data from the port with address P1, each neighboring cell receives data at a similarly addressed port and transmits data from a similarly addressed port such that information is transferred throughout the cluster in a uniform direction. By selecting the proper transmit port and the proper receive port, central cell 100 can be made to receive information from and transfer information to any of its eight nearest neighboring cells 102. Further, in accordance with the present invention, during one data transfer operation each cell can only transmit data from one port and all transmitting cells must transmit data from similarly addressed ports. However, each cell may receive data at any of the four ports, including the port from which it is transmitting data (see FIG. 2). Thus, each cell of FIG. 3 can be controlled to transmit data from the port addressed P1 and receive data from all ports to provide a uniform flow of data. Where such a data flow is desired, cell function generator 200 may take its inputs directly from ports 202-208 and, therefore, multiplexer 210, of FIG. 2, may not be necessary.

Further, returning to FIG. 1, it is shown that the plurality of cells comprising the distributed processing array are interconnected via the coupling nodes in a manner similar to that shown in FIG. 3. Each coupling node interconnecting a cell cluster is coupled to a plurality of neighboring cells such that these cells share a common connection and further such that no two similarly addressed ports are coupled to one another. Again, although controller 214 (FIG. 2) is not shown in FIG. 1, it will be understood that each cell of FIG. 1 is coupled to receive the same control signals from controller 214 as central cell 100 (FIG. 2) such that where central cell 100 receives data from a port addressed P3 and transmits data to a port addressed P1, each cell of FIG. 1 simultaneously receives data from and simultaneously transmits data to similarly addressed ports. By selecting the proper transmit and receive ports, each cell of FIG. 1 can be made to communicate with either of its eight nearest neighbors. Thus, information can be made to flow uniformly through the array of FIG. 1 either horizontally, vertically or diagonally.

It will be apparent to those skilled in the art that the array of FIG. 1 may be readily embodied in an integrated semiconductor circuit. To this end, the array of FIG. 1 is shown with a plurality of input/output pads 104 provided for coupling a semiconductor circuit to external devices. It will be noted that with the method of the present invention the number of connections necessary for an eight-neighbor interconnection scheme is reduced by nearly a factor of three over prior art designs, thus decreasing the number of input/output pads necessary for intercircuit communication and, thereby, increasing the number of cells which can be incorporated into a single integrated semiconductor circuit.

Further, it will be apparent to those skilled in the art that where the array of FIG. 1 is embodied in a single integrated semiconductor circuit, controller 214 of FIG. 2 may or may not be incorporated therein. In the preferred embodiment, controller 214 is not incorporated in a semiconductor circuit with the array of FIG. 1. This allows a plurality of semiconductor circuit arrays to be combined into a massive array wherein each cell of each semiconductor circuit comprising the massive array is controlled by the same controller 214.

Also, it should be noted that where the subject invention is embodied in a semiconductor circuit, the circuit may be configured with a plurality of similar cells disposed in a two-dimensional semiconductor circuit array and each having ports located at its four corners. Each coupling node may thus comprise a common boundary between each central cell and three of its neighboring cells.

While the subject invention has been described by reference to a two-dimensional distributed processing array, it will be readily appreciated that the present invention could be adapted for use in networks having more than two dimensions. As an example, a three-dimensional distributed processing array may be comprised of a multiplicity of cells wherein each 3 by 3 by 3 neighborhood comprises a central cell and twenty-six neighboring cells.

In general, for K-dimensional rectangular arrays, each cell comprises a hypercube having $3^K-1$ neighboring cells. The central cell of a neighborhood will include $2^K$ uniquely addressed ports and each neighboring cell will include $2^K$ similarly addressed ports at each of its $2^K$ corners. Further, a plurality of coupling nodes will be provided for coupling each corner port of the central cell to the $2^K-1$ corner ports of the neighboring cells with which it shares that particular corner such that these $2^K$ cells share a common connection and further such that no two similarly addressed ports are coupled to one another.

It will be appreciated by those skilled in the art that while the present invention has been described by reference to rectangular arrays and cells, other cell and neighborhood configurations are possible without departing from the true spirit of the invention.

While only several presently preferred embodiments of my novel interconnection scheme for a distributed processing system have been presented in detail herein, many modifications and variations will now become apparent to those skilled in the art. It is my intent, therefore, to be limited only by the scope of the appended claims and not by the specific details presented herein.

What is claimed is:

1. An array for manipulating data signals, comprising:
   a central cell having a plurality of ports for transmitting and receiving data signals, each said port of said central cell having a unique port address for identifying said port;
   a plurality of neighboring cells each including the same number of said ports as that of said central cell, the ports of each said neighboring cell having the same addresses as said central cell ports, said neighboring cells being coupled to said central cell via selected ones of their respective ports such that no two ports with the same address are coupled to one another, each said port of said central cell being coupled to the respective ports of at least three said neighboring cells; and
   each said central and neighboring cell comprising means for performing signal processing functions on the data signals received on said ports.

2. An array as recited in claim 1 further comprising means for controlling the transmission and receipt of said data signals between said central and neighboring cells; and
   each said central and neighboring cell being responsive to an instruction provided by said controlling means, so that during one information transfer operation all transmitting cells transmit from ports having the same address.

3. An array as recited in claim 1 wherein said central cell and said plurality of neighboring cells form a cell cluster, said array comprising a plurality of said clusters interconnected in a uniform pattern.

4. An array as recited in claim 3 further comprising means for controlling the transmission and receipt of said data signals between said central and neighboring cells; and
   each said central and neighboring cell being responsive to an instruction provided by said controlling means, so that during one information transfer operation all transmitting cells transmit from ports having the same address.

5. An array as recited in claim 3 wherein said plurality of cell clusters are embodied in a single integrated semiconductor circuit.

6. An array as recited in claim 5 further comprising means for controlling the transmission and receipt of said data signals between said central and neighboring cells; and
   each said central and neighboring cell being responsive to an instruction provided by said controlling means, so that during one information transfer operation all transmitting cells transmit from ports having the same address.

7. An array as recited in claim 5 wherein each said central cell has eight neighboring cells and each said central and neighboring cell has four said ports, the four ports each having a unique port address; and
   said plurality of cell clusters being interconnected to provide a two-dimensional rectangular array.

8. An array as recited in claim 7 further comprising means for controlling the transmission and receipt of said data signals between said central and neighboring cells; and
   each said central and neighboring cell being responsive to an instruction provided by said controlling means, so that during one information transfer operation all transmitting cells transmit from ports having the same address.

9. A distributed processing network, comprising:
   a plurality of cells each including a plurality of ports for transmitting and receiving information, each said port having a port address for identifying said port, said plurality of ports of each said cell respectively having unique port addresses, the same port addresses being assigned to each said cell;
   each said cell comprising means for performing signal processing functions on information received on said ports; and
   a plurality of coupling nodes, each said node being coupled to at least four of said cells via respective dissimilarly addressed ones of the ports of said at least four cells, so that the last recited cells are in communication with one another.

10. A network as recited in claim 9 further comprising means for controlling the transmission and receipt of information between said central and neighboring cells; and
    each said central and neighboring cell being responsive to an instruction provided by said controlling means, so that during one information transfer operation, all transmitting cells transmit from ports having the same address.

11. A network as recited in claim 1 wherein said plurality of cells are embodied in a single integrated semiconductor circuit.

12. A network as recited in claim 11 further comprising means for controlling the transmission and receipt of information between said central and neighboring cells; and
    each said central and neighboring cell being responsive to an instruction provided by said controlling means, so that during one information transfer operation, all transmitting cells transmit from ports having the same address.

13. A network as recited in claim 11 wherein each said central cell has eight neighboring cells and each said central and neighboring cell has four said ports, the four ports each having a unique port address; and
    said plurality of cells being arranged in a two-dimensional rectangular array.

14. A network as recited in claim 13 further comprising means for controlling the transmission and receipt of information between said central and neighboring cells; and
    each said central and neighboring cell being responsive to an instruction provided by said controlling means, so that during one information transfer operation, all transmitting cells transmit from ports having the same address.

15. A K-dimensional distributed processing array, comprising:
   a plurality of cells each including $2^K$ ports for transmitting and receiving information;
   a plurality of busses for interconnecting said cells such that each bus is coupled to $2^K$ distinct cells via said ports and further such that each said cell is coupled to $2^K$ distinct busses;
   each said cell comprising means for performing signal processing functions on information received on said ports; and
   K being an integer greater than one.

16. An array as recited in claim 15 wherein each said port has an identifying port address such that each said cell has dissimilarly addressed ports and further such that the same port addresses are assigned to each said cell, each said bus being coupled to dissimilarly addressed ports.

17. An array as recited in claim 16 further comprising means for controlling the transmission and receipt of information between said central and neighboring cells; and
   each said central and neighboring cell being responsive to an instruction provided by said controlling means, so that during one information transfer operation, all transmitting cells transmit from ports having the same address.

18. An array as recited in claim 16 wherein said plurality of cells are embodied in a single integrated semiconductor circuit.

19. An array as recited in claim 18 further comprising means for controlling the transmission and receipt of information between said central and neighboring cells; and
   each said central and neighboring cell being responsive to an instruction provided by said controlling means, so that during one information transfer operation, all transmitting cells transmit from ports having the same address.

20. An array as recited in claim 19 wherein each said central cell has eight neighboring cells and each said central and neighboring cell has four said ports, the four ports each having a unique port address; and
   said plurality of cells being arranged in a two-dimensional rectangular array.

21. An array as recited in claim 20 further comprising means for controlling the transmission and receipt of information between said central and neighboring cells; and
   each said central and neighboring cell being responsive to an instruction provided by said controlling means, so that during one information transfer operation, all transmitting cells transmit from ports having the same address.

22. In a distributed processing system including a plurality of cells and a plurality of coupling nodes, each said cell including a plurality of ports for transmitting and receiving data signals, the ports of each said cell respectively having unique port addresses and the same port addresses being assigned to each said cell, each said node being coupled to at least four of said cells via dissimilarly addressed ones of said ports, each said cell comprising means for performing signal processing functions on the data signals received on said ports, a method for transferring data signals between said cells comprising the steps of:
   said plurality of cells simultaneously transmitting data signals from ones of said ports having the same address; and
   said plurality of cells simultaneously receiving data signals at ones of said ports having the same address, such that information is transferred uniformly throughout the system.

23. A two dimensional array of data processing cells, said array comprising a plurality of central cells, each central cell being bordered by a plurality of neighboring cells each similar to said central cell, said cells having a plurality of ports for transmitting data to and receiving data from each other, each port of each said central cell being coupled to one port of each of at least three of said neighboring cells through a common connection, each central cell in said array being coupled in a similar manner to its neighboring cells, each said central and neighboring cell comprising means for performing signal processing functions on the data received on said ports, and means for activating said central cells to concurrently transmit data from one of said ports while concurrently activating said neighboring cells to receive data into a selected one of the ports coupled to said one port, so that data flows through said array from said central cells to said neighboring cells in a directionally analogous manner.

* * * * *

UNITED STATES PATENT AND TRADEMARK OFFICE
CERTIFICATE OF CORRECTION

PATENT NO. : 4,739,476
DATED : April 19, 1988
INVENTOR(S) : Charles M. Fiduccia

It is certified that error appears in the above-identified patent and that said Letters Patent is hereby corrected as shown below:

Column 8, line 45, "claim 1" should read --claim 9--.

Column 9, line 43, "claim 19" should read --claim 18--.

Signed and Sealed this

Twenty-seventh Day of April, 1993

Attest:

MICHAEL K. KIRK

*Attesting Officer*  Acting Commissioner of Patents and Trademarks